United States Patent [19]
Bucher

[11] Patent Number: 5,303,879
[45] Date of Patent: Apr. 19, 1994

[54] AIRCRAFT WITH A DUCTED FAN IN A CIRCULAR WING

[75] Inventor: Franz Bucher, Basel, Switzerland

[73] Assignee: Sky Disc Holding SA, Fribourg, Switzerland

[21] Appl. No.: 9,246

[22] Filed: Jan. 26, 1993

[30] Foreign Application Priority Data

Jan. 29, 1992 [CH] Switzerland .......... 258/92-5

[51] Int. Cl.⁵ .......... B64C 29/00; B64C 39/06
[52] U.S. Cl. .......... 244/23 C; 244/12.2; 244/23 B; 244/23 D; 244/82; 244/45 A
[58] Field of Search .......... 244/6, 7 B, 7 A, 10, 244/12.1, 12.2, 12.4, 12.5, 12.6, 23 B, 23 C, 23 D, 67, 82, 45 A

[56] References Cited

U.S. PATENT DOCUMENTS

| | | | |
|---|---|---|---|
| 1,959,270 | 5/1934 | Hedlof | 244/6 |
| 2,717,131 | 9/1955 | Barrett | 244/6 |
| 2,843,339 | 7/1958 | Streib | 244/12 |
| 2,989,269 | 6/1961 | Le Bel | 244/66 |
| 3,049,320 | 8/1962 | Fletcher | 244/7 C |
| 3,282,534 | 11/1966 | Serriades | 244/6 |
| 3,335,977 | 8/1967 | Meditz | 244/12.4 |
| 4,037,807 | 7/1977 | Johnston et al. | 244/12.1 |
| 4,196,877 | 4/1980 | Mutrux | 244/12.2 |
| 4,828,203 | 5/1989 | Clifton et al. | 244/23 B |
| 5,039,031 | 8/1991 | Valverde | 244/12.2 |
| 5,064,143 | 11/1991 | Bucher | 244/23 B |

Primary Examiner—David A. Bucci
Assistant Examiner—Virna Lissi Ansley
Attorney, Agent, or Firm—Fish & Richardson

[57] ABSTRACT

The aircraft comprises a rotor with a vertical axis arranged in a housing for generating a lift exceeding the weight of the aircraft. The housing is essentially shaped as a circular wing. A first way of guiding air is provided for controlling the air stream generated by the rotor, by means of which the position of the aircraft can be controlled in hovering flight. From hovering flight, the aircraft can be moved into a cruise flight, where the lift of the aircraft is generated aerodynamically by the circular wing of the housing and its forward thrust by a propeller. For the transition between hovering flight and cruise flight, a second way of guiding air is provided for controlling the pitch of the aircraft. The structure for the second way of guiding air is arranged outside a zone defined by the air stream of the rotor.

21 Claims, 7 Drawing Sheets

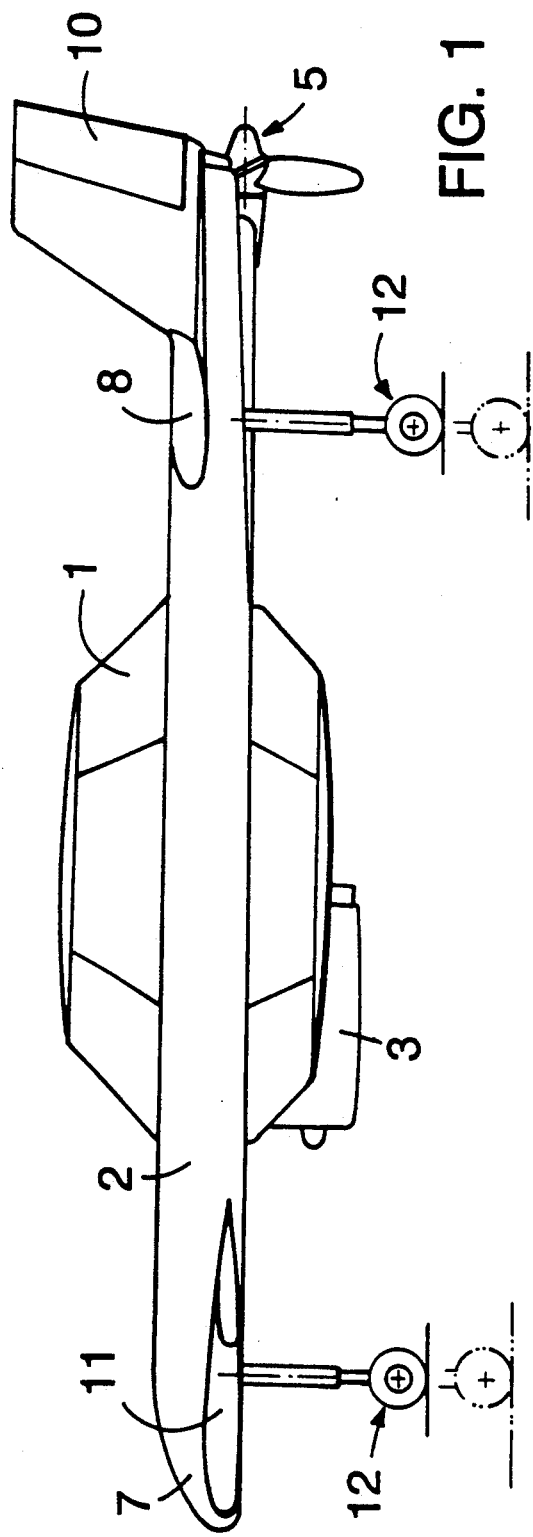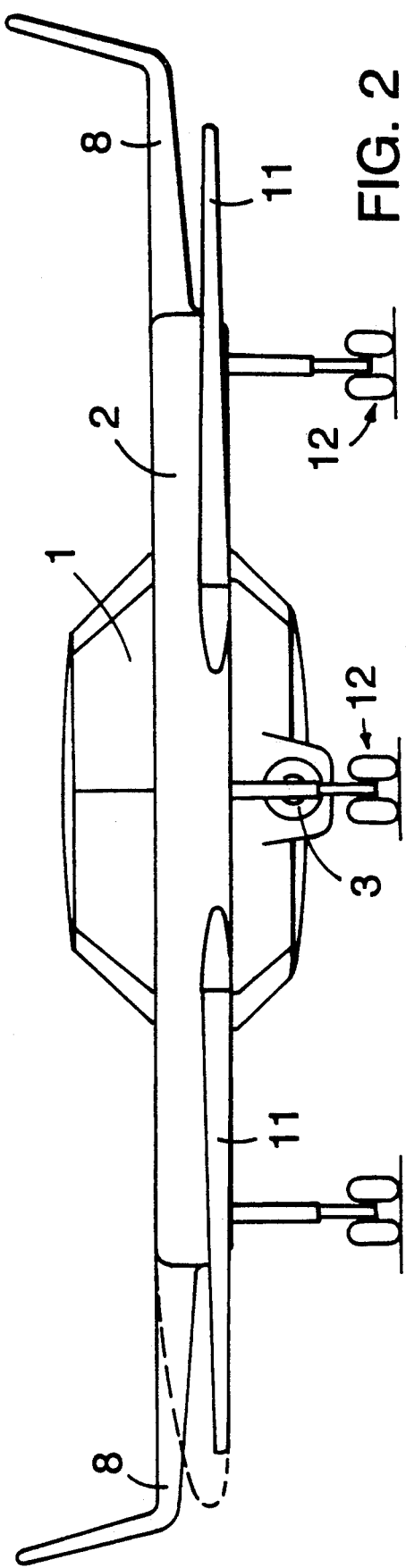

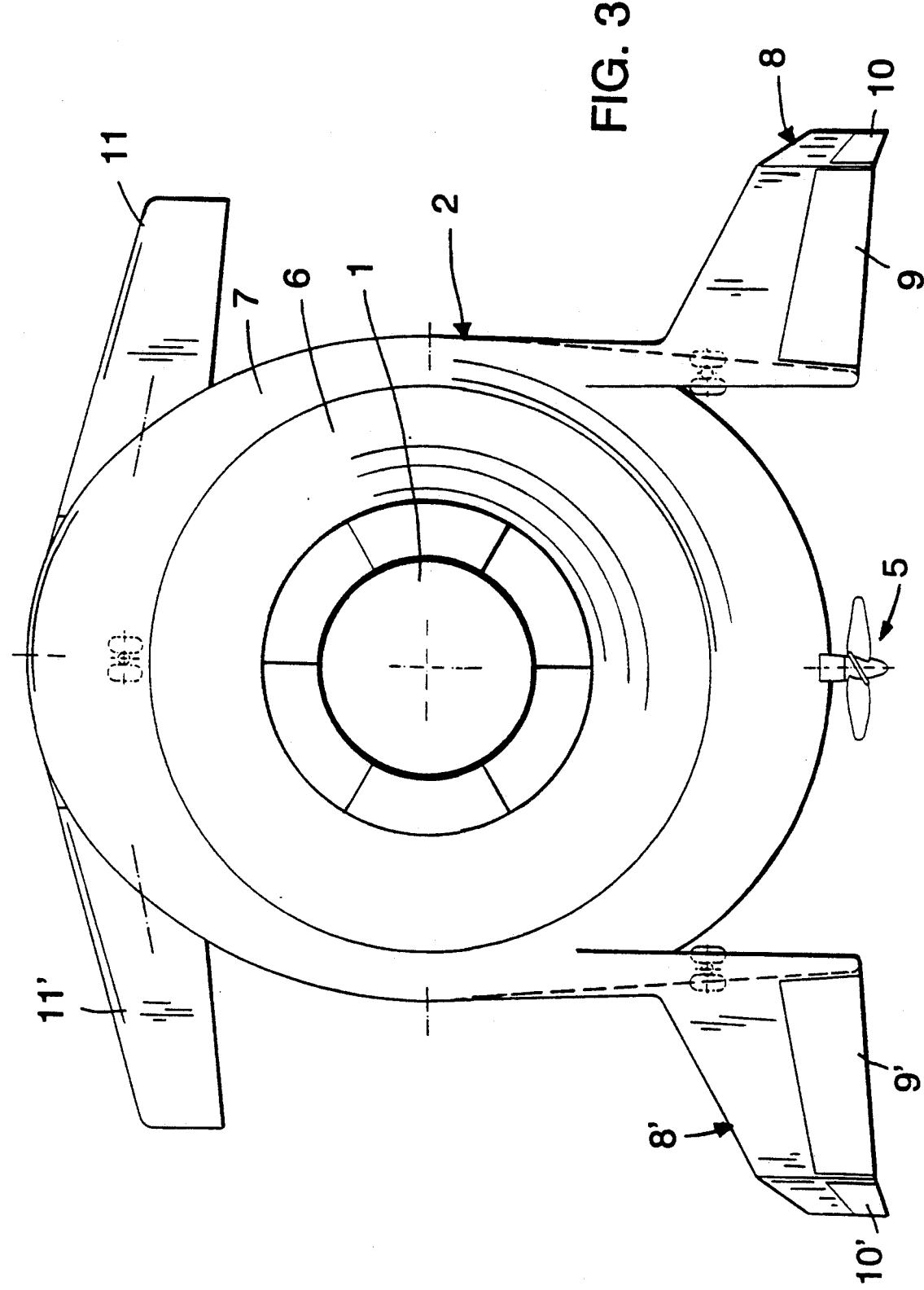

AIRCRAFT WITH A DUCTED FAN IN A CIRCULAR WING

BACKGROUND OF THE INVENTION

1. Field of the Invention

The invention refers to an aircraft comprising a housing shaped as a substantially circular wing, means for generating a horizontal thrust, at least one rotor arranged in said housing, first air guiding means for controlling the air flow generated by said rotor, and second air guiding means for controlling the pitch of the aircraft.

2. Description of the Related Art

An aircraft of a similar kind has been discussed in the published European patent application EP-0393410. This aircraft comprises a vertical, ducted fan or rotor for generating a lift exceeding the weight of the aircraft in hovering flight. This rotor is arranged in a circular housing and provided with air guiding means for controlling the air flow it generates. Experiments with this type of aircraft have shown that the maximum velocity of flight in a forward direction is limited to a comparatively low value. At higher velocities an interaction between the horizontal air flow around the housing and the air flow generated by the rotor occurs, which leads to instabilities.

The air flow patterns on circular wings are not very well known and even less data is available for circular wings housing a ducted fan.

SUMMARY OF THE INVENTION

Hence, it is a general object of the present invention to provide an aircraft of this kind that also allows, besides a controlled hovering flight, a driven forward flight at high velocities, such that the aerodynamic lift generated by the circular wing can be taken advantage of.

Now, in order to implement this and still further objects of the invention, which will become more readily apparent as the description proceeds, the aircraft is manifested by the features that air guiding means are arranged outside a zone defined by the air flow generated by the rotor. Furthermore, means for generating a forward thrust are arranged on the aircraft. These air guiding means are used to control the pitch of the aircraft during forward flight at higher velocities while the rotor is still in operation.

Experiments of the applicant with circular wings containing a ducted rotor, i.e. a ducted fan, have shown that at higher horizontal velocities the interaction between the horizontal air flow and the air stream generated by the rotor causes an increase of the aerodynamic lift in a forward part of the wing and a decrease of this lift in its rear part. At low velocities this effect can be compensated by an appropriate control and deflection of the rotor air stream. However, this becomes impossible above a certain velocity.

By arranging air guiding means, e.g. winglets, outside a zone of influence of the rotor air stream, it has surprisingly been found, however, that a range of velocities exists at which the pitch of the aircraft can either be controlled by controlling the rotor air flow or by using these winglets. This transition range allows the aircraft to reach higher velocities, at which the lift can be generated aerodynamically by the circular wing alone, such that a contribution of the rotor is not required anymore.

At low velocities the lift as well as the position of the aircraft is therefore controlled by the air stream of the rotor alone. At high velocities the lift is generated aerodynamically by the circular wing and by flaps and/or winglets. At intermediate velocities, in a transition range, the rotor air stream as well as aerodynamic forces on the wings or air guiding means contribute to the lift and the control of the craft.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 shows a side view of a first embodiment of the aircraft;

FIG. 2 shows a front view of the aircraft of FIG. 1;

FIG. 3 is a top view of the aircraft of FIG. 1;

DETAILED DESCRIPTION OF PREFERRED EMBODIMENTS

Figure 4:
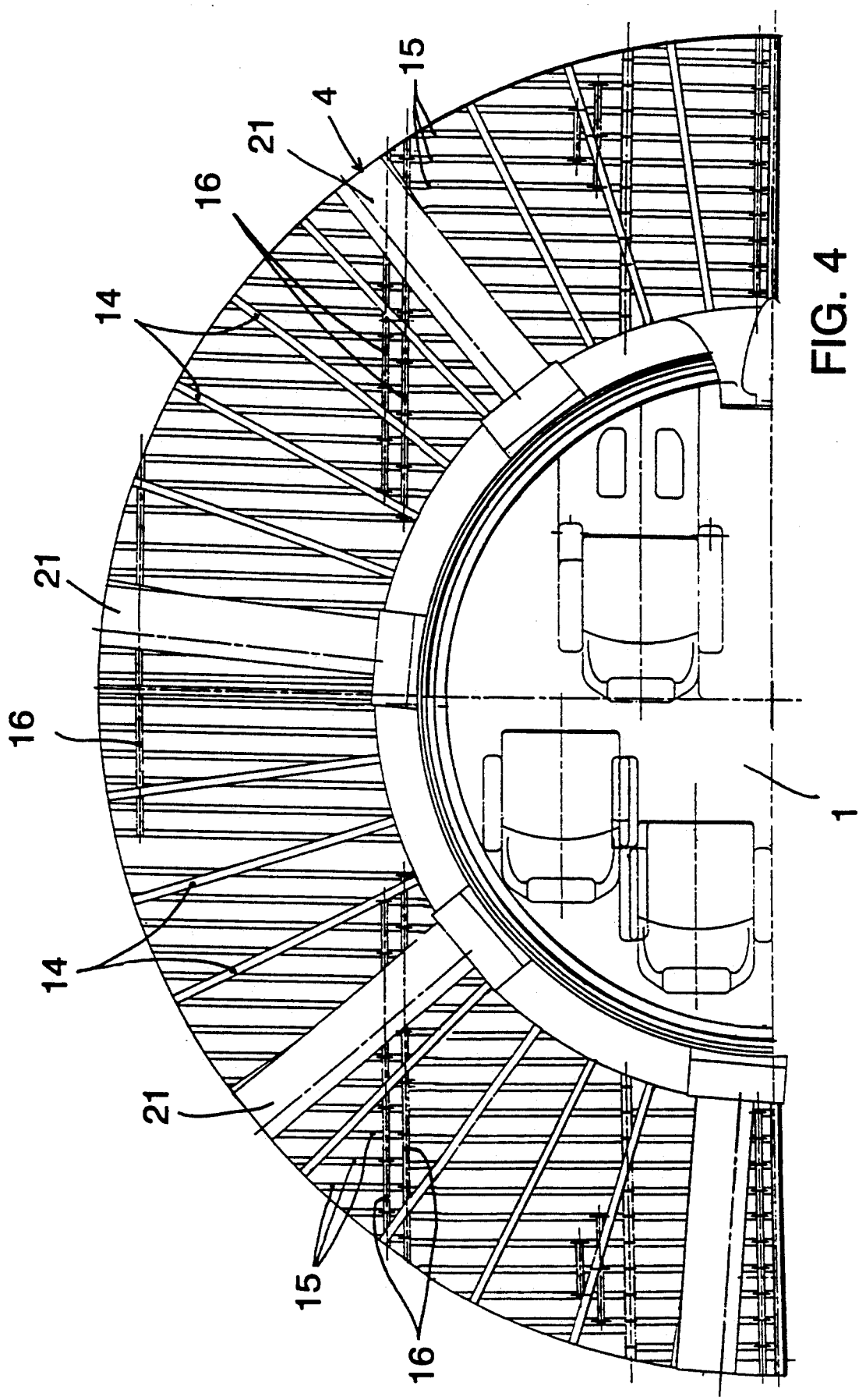
FIG. 4 is a top view of part of the rotor and the central cabin.

A first embodiment of the invention is shown in FIGS. 1-3, which show the housing and the arrangement of the winglets of an aircraft for six persons. A cabin 1 is arranged in the center of a rotor housing 2. The cabin extends above and below the rotor housing. The cabin provides room for six seats, including two seats for pilots. It also houses the engine 3 (see FIG. 5 for more details). The engine 3 drives a horizontally arranged rotor 4 (cf. FIGS. 5, 6) and a vertical propeller 5.

An annular zone 6 of the housing provides a passage of the air stream generated by the rotor 4 in hovering flight. This zone is surrounded by a part 7 of the housing, which forms a slightly elongated circular wing with a profile suitable for generating an aerodynamic lift in a horizontal air flow. The term "circular wing" used here is to be understood to comprise other wing shapes having a span width essentially equal to their length. Two separated rear wings 8, 8' are arranged laterally at part 7 of the housing. These wings 8, 8' are located outside a zone defined by the air stream generated by the rotor 4. This zone intersects the circular wing vertically in hovering flight and obliquely in forward flight. The rear wings 8, 8' comprise elevators 9, 9' and rudders 10, 10', which are used for controlling the air craft in transition flight and cruise, as will be explained below. Furthermore, front wings 11, 11' can be provided at the head of the aircraft. The wings could also be integrated in the (enlarged) circular wing.

A retractable undercarriage 12 is mounted at the bottom side of the housing.

Figure 5:
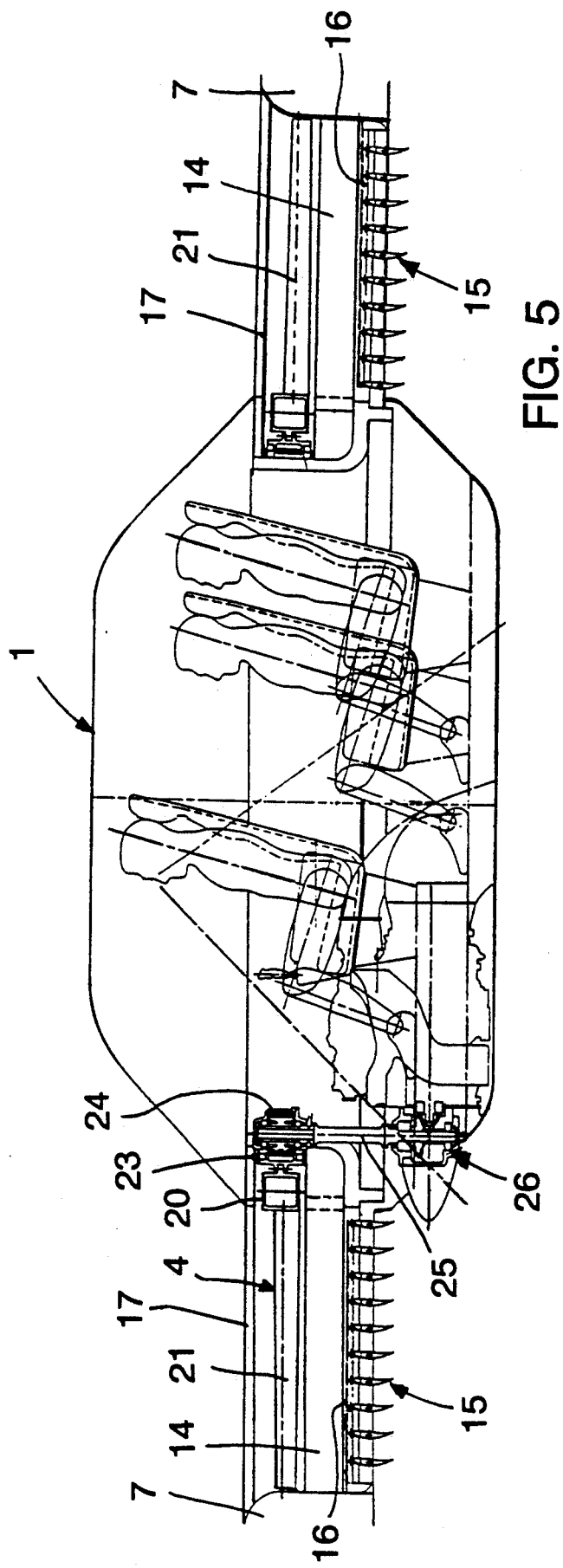
FIG. 5 is a sectional view of the part shown in FIG. 4.

The mechanical setup of the rotor 4 of this embodiment and of its drive is shown in FIGS. 4 and 5. Eight rotor blades 21 are mounted on the periphery of an annular profile 20 with a fixed angle of incidence. Depending on the rotation speed of the rotor and the arrangement of the blades, it is also possible to use a larger or a smaller number of blades. At the inner surface of the profile 20, a roller bearing 23 with an inner gear rack is engaged by a driving pinion 24 located on a shaft 25 of a differential gear 26. A second shaft of this differential gear 26 (not shown) drives the horizontal propeller 5. By braking the shaft 25 driving the rotor, the rotor speed can be decreased for partially or completely transferring the energy of the engine to the propeller 5, or vice versa. In hovering flight, the engine 3 drives only the rotor 4. In cruising flight the rotor is stopped and the energy of the engine is fully transferred to the propeller 5.

Below the rotor 4, flow control means 14 in the form of blades with a small angle of incidence of a first static flow control system are arranged to absorb the rotative component of the air stream generated by the rotor. These blades 14 extend radially between the passenger cabin 1 and the outer part 7 of the housing. The blades are load bearing structural parts of the housing. In this embodiment a total of 36 of such blades are installed guaranteeing a good rigidity of the housing.

Below the blades 14, a zone of increased pressure is generated, which pressure is discharged through an assembly of pivotal vanes 15 located below the blades 14 and the rotor 4. This assembly of vanes 15 is used for controlling the direction and velocity of the resulting air stream. In this first embodiment, most of the vanes 15 extend in a direction perpendicular to the principal forward direction of the aircraft. As it will be explained below, the vanes are divided into groups of individually pivotal sections. In each section, the vanes are pivoted by actuating rods 16 (cf. FIG. 6). All vanes of a section can be pivoted all simultaneously into one direction. Alternatively, pairs of adjacent vanes can be pivoted in opposite directions (cf. FIG. 6).

On its top side the rotor is protected by a cover grating with struts 17 extending parallel to the forward direction.

As it has already been mentioned before, the aircraft of this invention has several different modes of flight. Theses modes of flight are found in overlapping ranges of velocity, which is a prerequisite for a safe operation.

Figure 6:
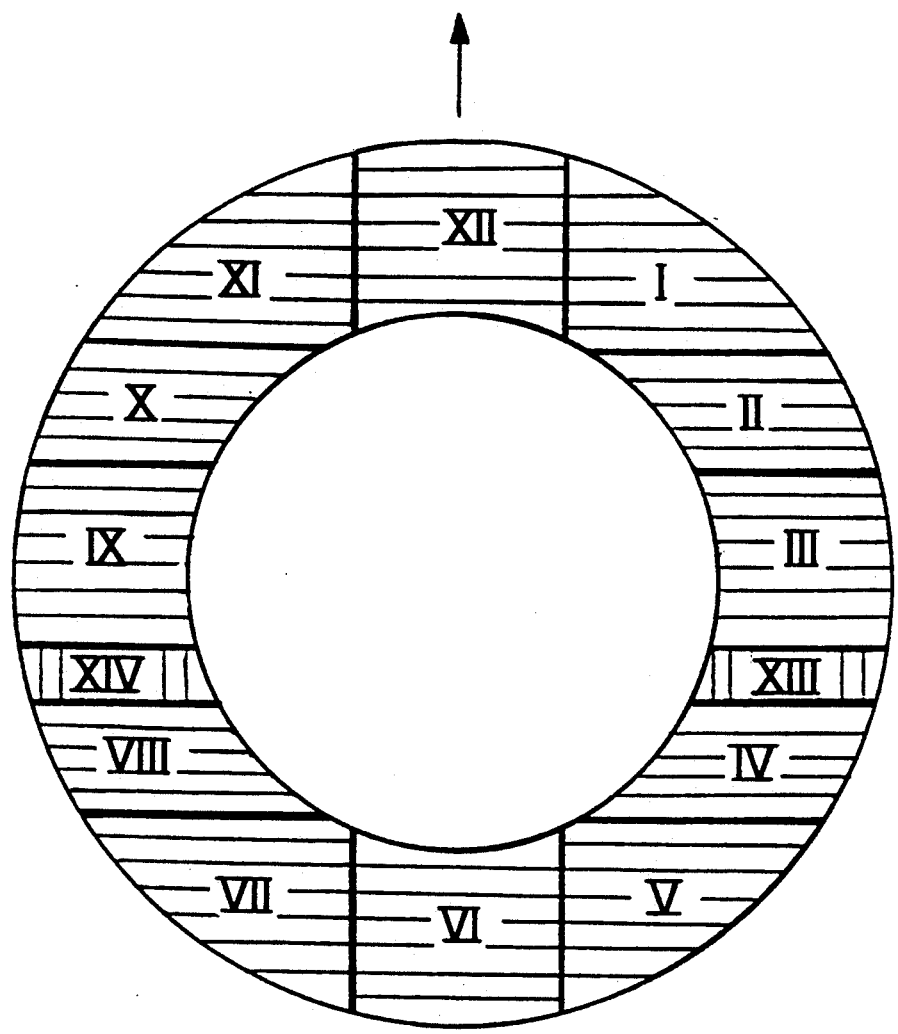
FIG. 6 is a schematic view of the sections of the vane assembly.

A first mode of flight is the hovering mode. In this mode the lift, the movements as well as the position are controlled by adjusting the rotor air stream, i.e. by throttling or deflecting it by means of the sections of the vane assembly. FIG. 6 schematically shows a first embodiment of this vane assembly. The individual sections are denoted by Roman numbers I-XIV.

If the vanes of a section are collectively pivoted away from their vertical position, the corresponding part of the rotor air stream is deflected. This produces a reactive force with a horizontal component, which can be used as a thrust into the forward direction or for controlling the lateral position of the craft. If pairs of adjacent vanes of a section are pivoted in opposite directions, no such horizontal force is generated, but the lift of the respective section is decreased.

Using these principles the position and movement of the aircraft can be controlled during hovering flight.

The sections XII and VI with all vanes pivoted in parallel directions are used for generating a forward or backward thrust along the principal forward direction of the aircraft. Sections III and IX with vanes pivoted in opposite directions can be used for rotating the craft, while they can contribute to the forward thrust when their vanes are parallel.

The eight sections I, II, IV, V, VII, VIII, X, and XI are used for controlling the vertical movements of the aircraft with pairs of adjacent vanes pivoted in opposite directions, such that the lift of each section can be modi7 fied without generating a horizontal thrust. The sections I and XI together with V and VII can e.g. control the pitch of the aircraft. By partially closing the vanes of sections I and XI, the head of the craft dips downward because the lift of the forward part of the aircraft is decreased. A lateral tilt of the aircraft can be controlled by sections II and IV together with sections X and VIII.

Lateral movements can be controlled by pivoting the vanes of sections XIV and XIII in parallel directions.

Generally, the pivoting control movements of the vanes start from the opened, vertical position of the vanes. Adjustments for controlling the tilt and horizontal and vertical movements are thereby superimposed and carried out simultaneously. In this way, all sections are more or less open. This reduces local fluctuations of pressure over the circumference of the rotor air stream and guarantees a smooth operation of the rotor.

In this way forward speeds up to approximately 55 km/h (at SLSC, "Sea Level Standard Conditions") can be reached in hovering flight. As it has been discussed before, the increasing horizontal air flow in interaction with the rotor air stream generates a lift on the circular wing, which is much stronger in the forward part of the wing than in its rear part. From ca. 35 km/h the wings 8, 8' and or 11, 11' becomes increasingly effective for compensating the resulting pitch.

A transition mode is reached for velocities between ca. 55 km/h and 90 km/h. At these velocities (or even earlier) the propeller 5 is used as a propulsion unit to generate at least part of the forward thrust. In this mode, the controlling influence of the vanes 15 decreases and is increasingly replaced by the effect of the winglets, which are arranged laterally outside the rotor air stream and are therefore not affected by it. In this way, a means for controlling the pitch of the aircraft is provided that is independent from the rotor air stream and the flow around the circular wing.

From a velocity of approximately 90 km/h up to the maximum velocity of ca. 400 km/h (SLSC) the thrust is fully generated by the propeller 5 and the lift is generated aerodynamically by the circular wing 2 in the horizontal air flow (cruise mode). The vanes are closed and the rotor 4 has no effect. No air flow is passing through the circular wing. The craft is controlled in a conventional way by means of the elevators and rudders of the wings 8, 8'.

The propeller 5 is of course not the only possible means for propagating the aircraft. The thrust could e.g. also be generated by means of a convertible turbine, which can be used to drive the rotor in hovering flight and to create an air jet in cruise mode.

As it has already been mentioned, the wings 8, 8' and 11, 11' can be used to compensate the pitch generated by the interaction between the rotor air stream and a horizontal air flow in forward flight, until a sufficient aerodynamic lift is generated by the circular wing alone. Then the rotor can be switched off, and the aircraft is operated in the more economic cruise mode.

In this cruise mode, the aircraft requires less motor power than in hovering or transition mode. Therefore, it may be possible to operate an overloaded aircraft in cruise mode, while hovering and transition cannot be used. In this case, conventional, propeller powered take-off and landing may still be possible.

FIGS. 7-11 show a second, preferred embodiment of the aircraft. The differences between this second embodiment and the first embodiment according to FIGS. 1-6 can best be seen from FIGS. 7 and 10.

Figure 7:
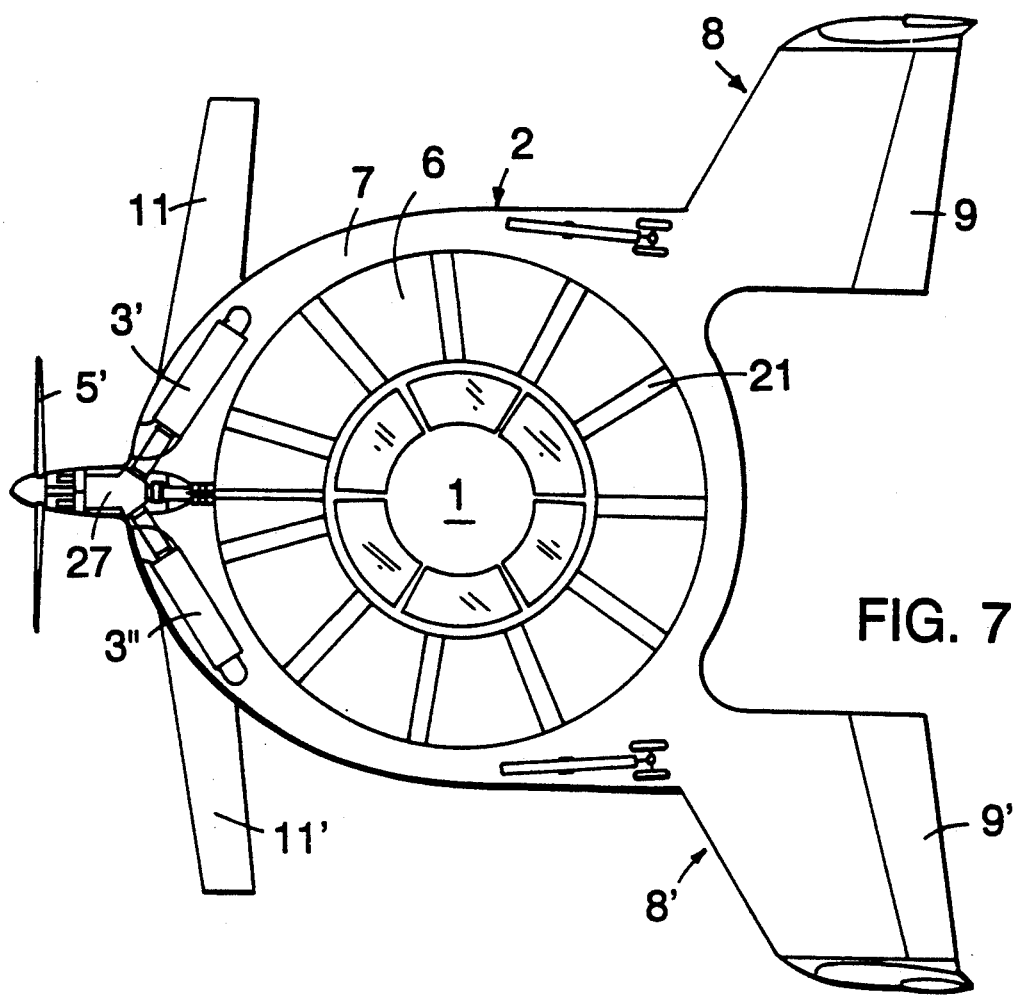
FIG. 7 is a top view of a second embodiment of the aircraft.
Figure 8:
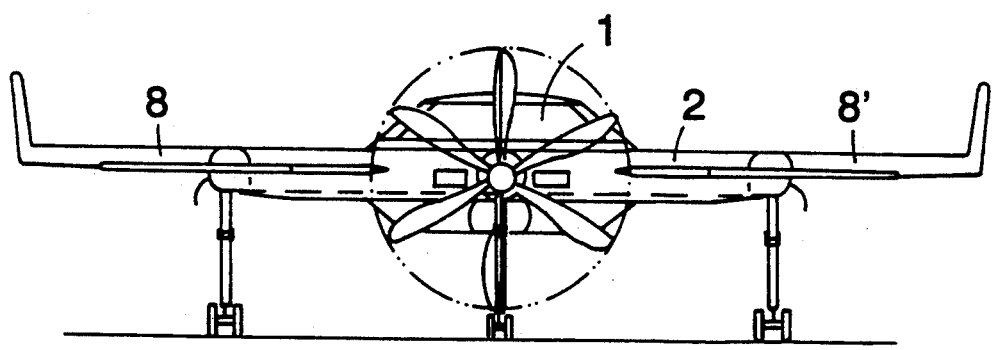
FIG. 8 is a front view of the aircraft of FIG. 7.
Figure 9:
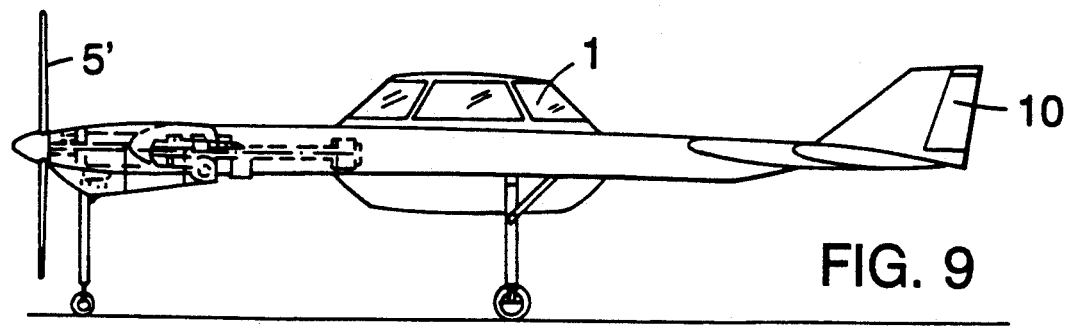
FIG. 9 is a side view of the aircraft of FIG. 7.

FIG. 7 shows that the propeller 5' is located at the forward end of the aircraft. The power of two engines 3', 3" is combined in a gear 27, which is driving the propeller 5'. The eleven rotor blades 21 are again driven over a driving shaft, which can e.g. be coupled to the gear 27 by means of a clutch or coupling. This coupling, which is preferably hydraulic or magnetic allows disconnection of the rotor from the engine in cruise mode. For controlling the thrust generated by the propeller, the angle of incidence of the propeller blades can be adjusted. This design obviates the need for a differential gear as it was used in the first embodiment.

Figure 11:
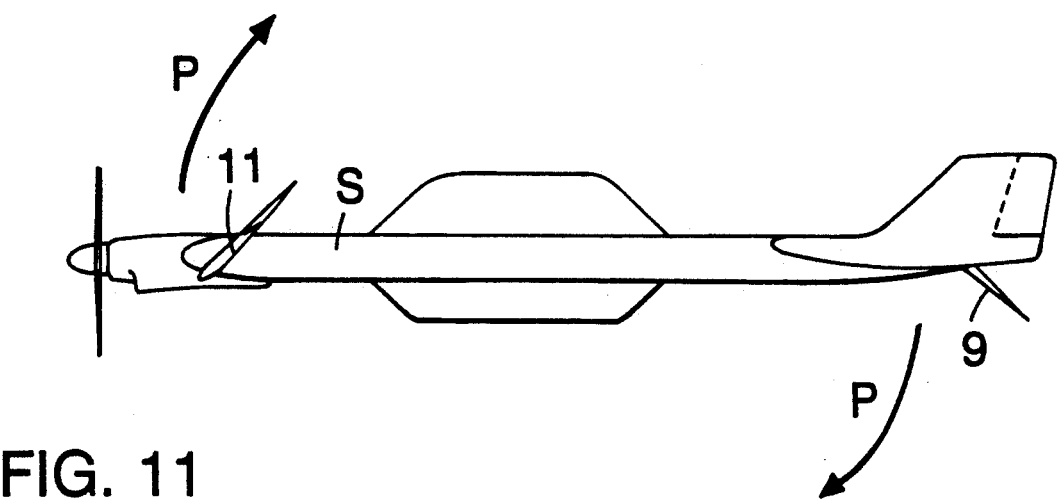
FIG. 11 is an illustration of the pitching forces acting on the craft in transition flight.

Arranging the engines 3', 3" at the head of the aircraft leads to a center of mass of the craft that lies in front of the aerodynamic center of the aircraft. This improves the aerodynamic stability in transition mode, as it is illustrated in FIG. 11. As it was mentioned above, the interaction of a horizontal air flow in forward flight and the rotor air stream leads to a pitch shown by the arrows P of FIG. 11. This pitch is compensated by adjusting the angles of incidence of the elevators 9, 9' and/or the forward wings 11, 11'. If the center of mass S of the aircraft lies in front of its aerodynamic center, an additional pitching moment is created that supports the action of the elevators and/or the forward wings.

Figure 10:
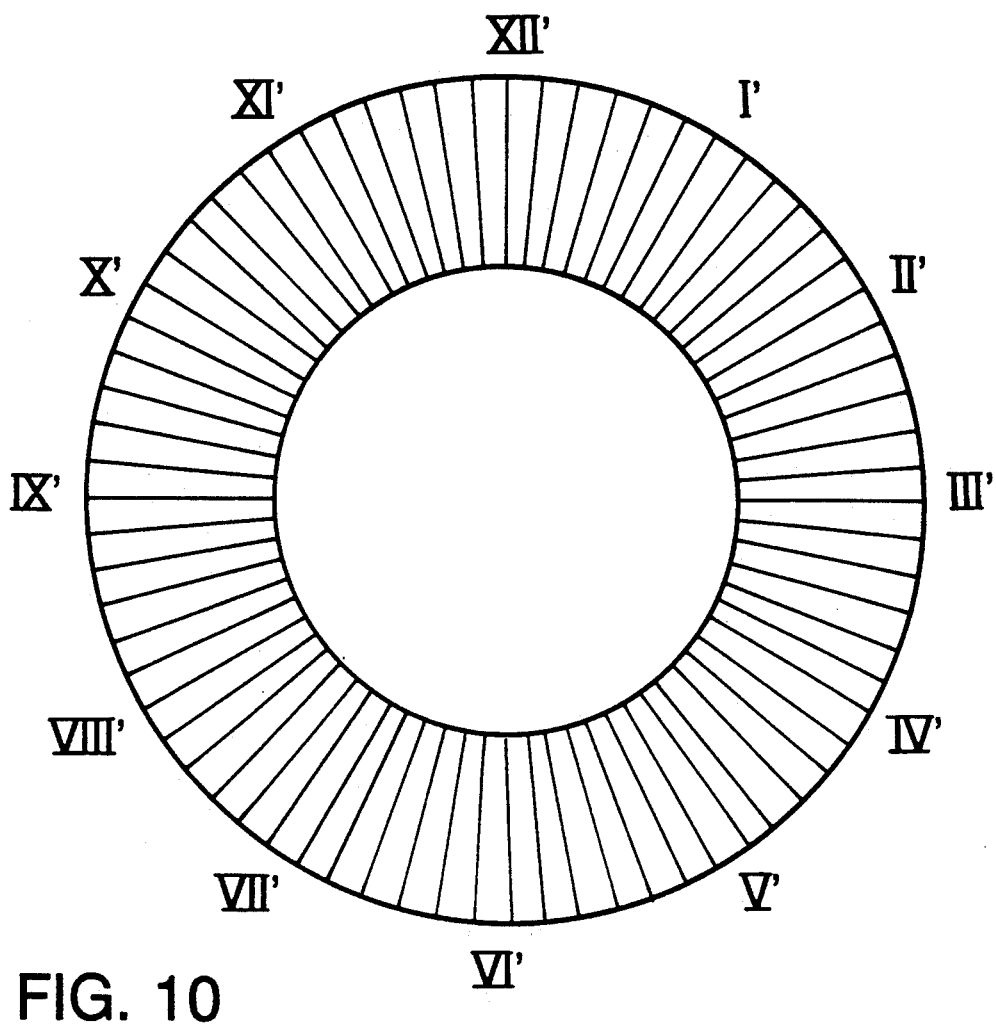
FIG. 10 is a second embodiment of the sections of the vane assembly.

The arrangement of the vanes for guiding the rotor air stream of the second embodiment of the invention is shown in FIG. 10. In contrary to the first embodiment, all vanes extend in radial direction. Again, the vanes are divided into groups of individually pivotal sections (I'-XII'). All these sections are essentially identical. This results in a modular construction of the vane assembly, which simplifies maintenance and reduces production costs. A defunct section can easily be removed and replaced by a new section.

In this embodiment, the fine control of the forward thrust in hovering flight is realized by changing the pivot angle of the vanes of sections III' and IX', while lateral displacements are controlled by sections XII' and VI'. For controlling the lift of each section, pairs of adjacent vanes can again be rotated in opposite directions, as described above.

Coarse adjustment of the forward thrust is controlled by changing the angle of incidence of the blades of the propeller 5'.

The two embodiments described above show some of the possible, preferred realizations of the invention. Further variants, however, are possible. Especially, the shape and arrangement of the wings 8, 8', 11, and 11' can be varied in many ways. Care should be taken, however, to make sure that at least part of these air guiding means are arranged outside the influence of the air stream generated by the rotor to guarantee a good control of the aircraft during transition flight.

All embodiments of the aircraft combine the advantages of a helicopter and an airplane in two separated modes of operation. The transition between these modes does not lead to instabilities and is safely controlled. As can be seen from FIGS. 1, 2, and 5, the length and width of span of the described aircraft for six passengers are comparable to those of a conventional airplane and range e.g. between 10 and 15 meters. The maximum forward speed is also comparable to conventional airplanes of this category. In cruise mode, the aircraft can therefore be compared to conventional airplanes. It has, however, the advantage of being able to be operated in hovering flight, such that maneuvers of a helicopter can be carried out as well. The described aircraft is also especially suited for medium sized passenger airplanes to be used in regular air service.

While there are shown and described present preferred embodiments of the invention, it is to be distinctly understood that the invention is not limited thereto but may be otherwise variously embodied and practiced within the scope of the following claims.

I claim:

1. An aircraft comprising a housing shaped as an essentially circular wing for generating an aerodynamic lift in a horizontal air flow, means for generating a horizontal thrust in a principal forward direction, at least one nonpivotal driven rotor with an essentially vertical axis of rotation for generating a rotor air stream, said rotor being arranged in said housing and designed for generating a lift exceeding the weight of said aircraft, first air guiding means arranged within said rotor air stream adjustable for controlling said rotor air stream, said first air guiding means comprising radially extending vanes with pairs of adjacent vanes being adapted to be pivoted in opposite directions, said first air guiding means being capable of substantially preventing undesirable pitch of said aircraft during a portion of flight, and second air guiding means arranged outside a zone defined by said rotor air stream, which second air guiding means are shaped for influencing the pitch of the aircraft during flight along said principal forward direction.

2. The aircraft of claim 1, wherein said second air guiding means are arranged in respect to said principal forward direction laterally outside said rotor air stream.

3. The aircraft of claim 2, wherein at least part of said second air guiding means are arranged on said housing being said rotor.

4. The aircraft of claim 2, wherein at least part of said second air guiding means are arranged on said housing in front of said rotor.

5. The aircraft of claim 3, wherein at least part of said second air guiding means are arranged on said housing in front of said rotor.

6. The aircraft of claim 1, wherein said means for generating a horizontal thrust are designed for reaching such horizontal speeds that the aerodynamic lift of the aircraft exceeds the weight of the aircraft.

7. The aircraft of claim 1, wherein said means for generating a horizontal thrust comprise said first air guiding means, which first air guiding means are adjustable for deflecting said rotor air stream horizontally thereby generating a horizontal thrust.

8. The aircraft of claim 1, wherein said means for generating a horizontal thrust comprise at least one horizontal propulsion unit, which horizontal propulsion unit is designed to generate a horizontal thrust by generating a repulsive air stream in a horizontal direction.

9. The aircraft of claim 8, wherein said horizontal drive unit comprises a driven fan with an axis of rotation parallel to said principal forward direction.

10. The aircraft of claim 1, wherein said vanes are divided into groups of individually pivotal sections.

11. The aircraft of claim 10, wherein at least one of said sections alternatingly comprises vanes pivotal into a first and into a second direction, respectively, wherein said first direction is opposite to said second direction.

12. The aircraft of claim 10, wherein all said sections are essentially of identical design.

13. The aircraft of claim 10, wherein said pivotal vanes are extending in a radial direction in respect to said axis of rotation of said rotor.

14. A method for controlling an aircraft, said aircraft comprising
- a housing shaped as an essentially circular wing for generating an aerodynamic lift in a horizontal air flow,
- means for generating a horizontal thrust in a principal forward direction,
- at least one nonpivotal rotor with an essentially vertical axis of rotation for generating a rotor air stream, said rotor being arranged in said housing and designed for generating a lift exceeding the weight of said aircraft,
- first air guiding means arranged within said rotor air stream for controlling said rotor air stream, said first air guiding means comprising radially extending vanes with pairs of adjacent vanes being adapted to be pivoted in opposite directions, said first air guiding means being capable of substantially preventing undesirable pitch of said aircraft during a portion of flight, and
- second air guiding means arranged outside a zone defined by said rotor air stream shaped for generating aerodynamic forces and adjustable for influencing the pitch of the aircraft during flight along said principal forward direction;

said method comprising:
- a hovering mode, in which the lift of the aircraft is generated by said rotor and the position of the aircraft is controlled by said first air guiding means,
- a cruise mode, in which the lift of the aircraft is generated by the aerodynamic lift of said housing and said second air guiding means, and
- a transition mode, in which the lift of the aircraft is generated in part by said aerodynamic lift of said housing an in part by said rotor.

15. The aircraft of claim 10, having only one driven rotor, wherein said first air guiding means comprise flow control means arranged between said rotor and said assembly of pivotal vanes and shaped for absorbing a rotative component of said rotor air stream.

16. The aircraft of claim 15, wherein said flow control means comprise a plurality of guiding vanes extending in a radial direction in respect to said axis of rotation of said rotor.

17. The aircraft of claim 16, wherein said guiding vanes are load bearing members of said housing.

18. The method of claim 14, wherein said cruise mode said vanes are closed to form an essentially closed surface.

19. The method of claim 14, wherein in said transition mode, said second air guiding means are used to compensate forces generated by said rotor air stream and influencing the pitch of the aircraft.

20. The method of claim 14, wherein in said transition mode, said first air guiding means are adjusted to deflect said rotor air stream in a direction opposite said principal forward direction.

21. The method of claim 14, wherein said vanes are divided into groups of individually pivotal sections and wherein said hovering mode all said sections are at least partially opened for said rotor air stream.

* * * * *